United States Patent [19]
Swaney, Jr.

[11] 3,747,199
[45] July 24, 1973

[54] ALUMINUM BRAZING
[75] Inventor: O. William Swaney, Jr., Richmond, Ind.
[73] Assignee: Philco-Ford Corporation, Philadelphia, Pa.
[22] Filed: Mar. 9, 1972
[21] Appl. No.: 233,283

[52] U.S. Cl.................... 29/494, 29/488, 29/497
[51] Int. Cl...................... B23k 31/02, B23k 35/38
[58] Field of Search...................... 29/488, 494, 497

[56] References Cited
UNITED STATES PATENTS
3,457,630  7/1969  Schwartz et al. .................... 29/494
3,482,305  12/1969  Dockus et al. .................... 29/494 X
3,497,944  3/1970  Antle .................... 29/494
3,514,842  6/1970  Beuyukian et al. .................... 29/494

Primary Examiner—Robert D. Baldwin
Assistant Examiner—Ronald J. Shore
Attorney—Robert D. Sanborn

[57] ABSTRACT

This invention is directed to a process for the fluxless vacuum brazing of aluminum articles in which successful brazing is accomplished without the necessity for complete degreasing which has heretofor been considered absolutely necessary.

4 Claims, No Drawings

ALUMINUM BRAZING

THE PERTINENT PAST

It has long been known to braze aluminum articles with flux either at atmospheric pressure or under vacuum. The usual aluminum stock employed in these processes has had a cladding of a layer of an aluminum alloy containing an element capable of depressing its melting point. The element usually used was silicon.

The brazing operation is conducted by subjecting the preformed article usually in a supporting fixture to a temperature intermediate the melting point of the surface cladding alloy and the base metal which is essentially pure aluminum or aluminum with a minimum of alloying additions.

A process has recently been introduced to the art in which the cladding on the aluminum base destined for vacuum fluxless brazing has been modified by incorporating therein a small amount of magnesium or alternatively magnesium is caused to be present in the brazing chamber. This concept is treated in detail in the following United States Letters Patent Nos.:

3,321,828

3,322,517

3,373,482

THE INVENTION

It has long been the belief in the aluminum brazing industry that absolute chemical cleanliness of the surface is a 'sine qua non' for satisfactory wetting and brazing. This invention is predicated upon my discovery that such cleanliness is not only not necessary, but may be an unnecessary and harmful impediment to the entire process.

The fabrication of a typical aluminum brazed heat exchanger is an example of this invention. Specific reference is made to the conventional plate and fin heat exchanger employed as an evaporator in a usual automotive air conditioning system. The clad aluminum sheets from which this evaporator is fabricated are formed cold mechanically both in continuous rolls and in conventional forming presses.

These rolling and pressing operations require the presence of a lubricant to prevent undue wear on the dies and rolls and tearing and malforming of the aluminum parts. A very large variety of lubricants are available and satisfactory for this operation provided they are quantitatively removed prior to the actual brazing step. This quantitative removal is ordinarily accomplished by the so called vapor phase degreasing process.

This invention involves preheating the assembled and clamped aluminum article to be brazed to a temperature of 300° to 500°F and subjecting the heated article to a vacuum of about 100 microns.

In a batch process this may be accomplished by introducing the aluminum articles into the brazing furnace from atmosphere and then increasing the vacuum and temperature, care being taken not to increase the temperature sufficiently rapidly to crack or carbonize the lubricant. Many lubricants are available which will volatilize quantitatively at between 300° and 500°F and 100 microns pressure. However such oils would tend to crack if heated to 500°F at atmospheric pressure and the aluminum would certainly oxidize. It is essential that the walls of the furnace be kept within the specified temperature range so that the evaporated lubricants will not condense on the walls, but will be drawn into the vacuum system and so disposed of.

It will be readily appreciated by those skilled in the art that this invention is just as applicable to continuous or semicontinuous process as to a batch process. In these non-batch processes the aluminum articles are first placed into an entrance chamber which is capable of being heated and evacuated and which is separated from the brazing chamber by a vacuum tight door. In these non-batch processes the volatilization of the lubricant can readily be accomplished in the entrance chamber and the perfectly clean aluminum articles then transferred to the brazing chamber.

It is further to be noted that the preheating of the aluminum articles need not be entirely accomplished in chambers capable of evacuation. The preliminary part of the preheating may be accomplished in the open air preferably by radiant heat. Care must be taken not to crack the lubricant nor to oxidize the aluminum article in such atmospheric preheating steps.

The lubricant used in the rolling and forming operations is a carefully refined and ash-free petroleum base composition known to the trade as Cindol 3,401. However, any lubricant having a similar quantitative volatility may be substituted and successfully brazing accomplished.

After the lubricants have been satisfactorily volatilized, both the temperature and vacuum are increased to effectuate the braze. The maximum temperature reached is ordinarily in the vicinity of 1,160°F and the vacuum should be at least as high as 0.01 micron although under some conditions a vacuum of 0.1 micron will suffice. Again it is essential that the elevation of the temperature and the increase in the vacuum be scheduled so that at no time is the aluminum article exposed to a combination of temperature and exposure to oxygen or water vapor which will oxidize the exposed aluminum surfaces and inhibit proper wetting and brazing.

It has been found that brazed aluminum air conditioning evaporators produced in accordance with the practice taught supra have a surface color directly comparable to new aluminum as received from suppliers. The evaporators produced employing conventional degreasing procedures have a distinctly darker or smoked appearance.

I claim as my invention:

1. The process of producing a bright surfaced aluminum article which has been assembled from a plurality of closely fitted aluminum parts at least a portion of which have been fabricated from aluminum sheet base stock clad with an alloy of aluminum having a melting point lower than the aluminum sheet base stock comprising fabricating such individual parts with the aid of a volatile lubricant, assembling the individual parts to form the final aluminum article, fixturing the individual parts in place and without the interposition of any quantitative lubricant-removal process, subjecting the fixtured assembly carrying residual lubricant to vacuum and radiant heat which combined will volatilize any residual lubricant remaining on the fixtured assembly without decomposition and remove such vaporized lubricants from the vicinity of the fixtured assembly, and then increasing the vacuum and radiated heat applied to the fixtured article to effectively complete the brazing operation.

2. The process recited in claim 1 in which at least a portion of the heating of the article for lubricant removal is accomplished prior to the application of the vacuum.

3. The process recited in claim 1 in which the fixtured articles are heated to a temperature in the range of 300° to 500°F for lubricant removal.

4. The process recited in claim 1 in which the vacuum employed for lubricant removal is about 100 microns.

* * * * *